(12) United States Patent
Tseng

(10) Patent No.: US 9,033,007 B2
(45) Date of Patent: May 19, 2015

(54) GATHERING DEVICE FOR GATHERING PLASTIC MEMBERS

(71) Applicant: Min-Tsang Tseng, New Taipei (TW)

(72) Inventor: Min-Tsang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 211 days.

(21) Appl. No.: 13/661,033

(22) Filed: Oct. 26, 2012

(65) Prior Publication Data

US 2013/0180621 A1    Jul. 18, 2013

(30) Foreign Application Priority Data

Jan. 12, 2012    (TW) .............................. 101101167 A

(51) Int. Cl.
 *B65B 65/00*    (2006.01)
 *B29C 45/17*    (2006.01)

(52) U.S. Cl.
 CPC .................................. *B29C 45/1769* (2013.01)

(58) Field of Classification Search
 USPC .............................. 141/67, 330–345; 425/472
 See application file for complete search history.

(56) References Cited

U.S. PATENT DOCUMENTS 6,715,647 B1 *    4/2004    Ivins .............................. 222/166
8,469,064 B2 *    6/2013    Dobo .............................. 141/86

* cited by examiner

*Primary Examiner* — Nicolas A Arnett
(74) *Attorney, Agent, or Firm* — Novak Druce Connolly Bove + Quigg LLP

(57) ABSTRACT

Provided is a gathering device for gathering plastic members. The gathering device includes a gathering portion and a tray detachably connected to the gathering portion. The gathering portion includes an outer shell, a hollow inner shell and a number of fans. The inner shell is received in the outer shell. The inner shell includes a number of vent. The fans are positioned between the outer shell and the inner shell for blowing ions into the inner shell through the vents. The tray is configured for containing the plastic members passing through the gathering portion.

13 Claims, 4 Drawing Sheets

GATHERING DEVICE FOR GATHERING PLASTIC MEMBERS

BACKGROUND

1. Technical Field

The present disclosure relates to gathering devices, and particularly, relates to a gathering device for gathering plastic members made by an injection mold process.

2. Description of Related Art

Plastic members may be produced by an injection molding process and gathered in a gathering bin after the injection molding process. However, static charges may be generated during the injection molding and gathering processes, thus the plastic members may fly along random tracks because of the electrostatic forces. Therefore, it becomes difficult to gather the plastic members.

What is needed therefore is a gathering device addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
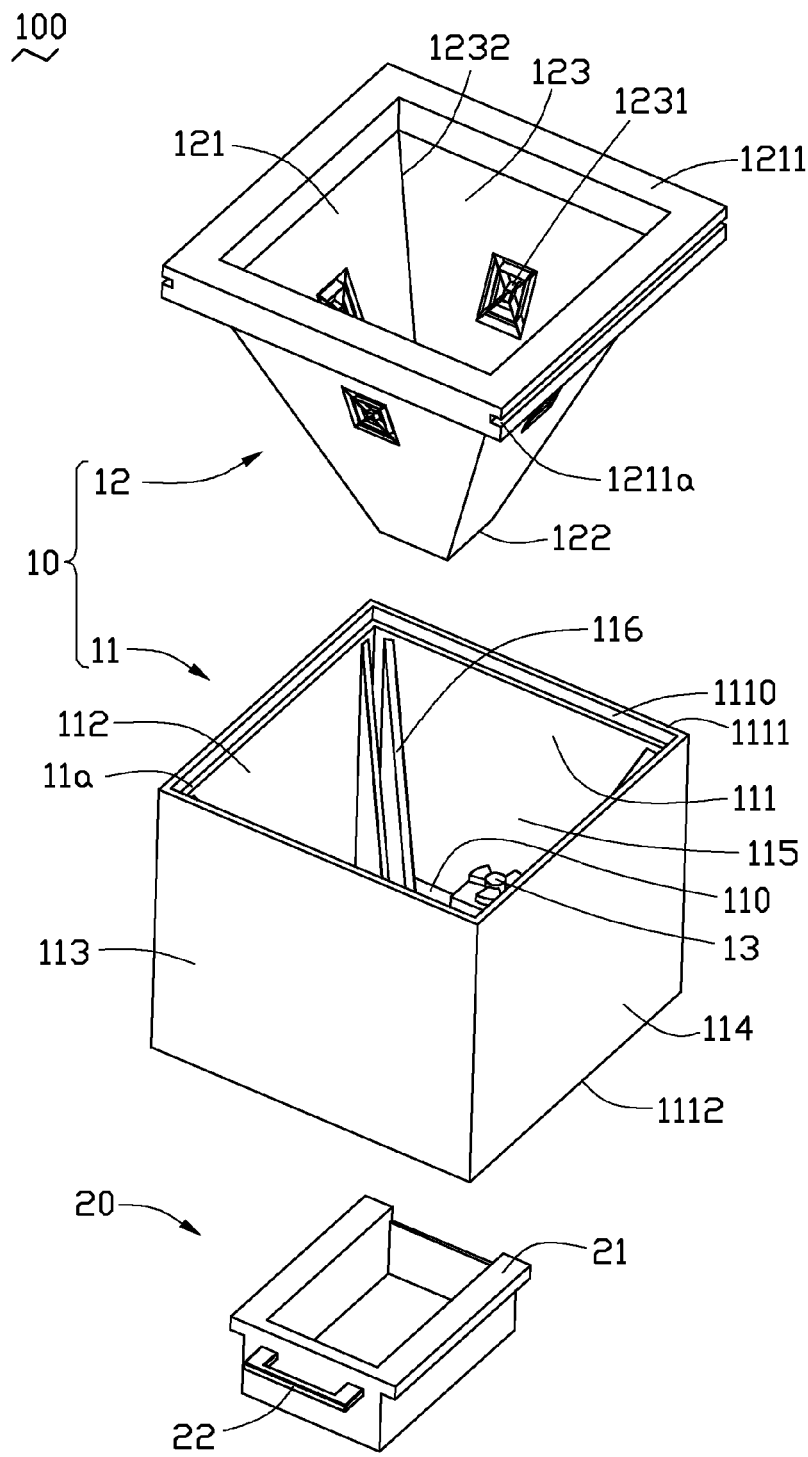
FIG. 1 is an isometric exploded schematic view of a gathering device, according to an exemplary embodiment of the present disclosure.
Figure 2:
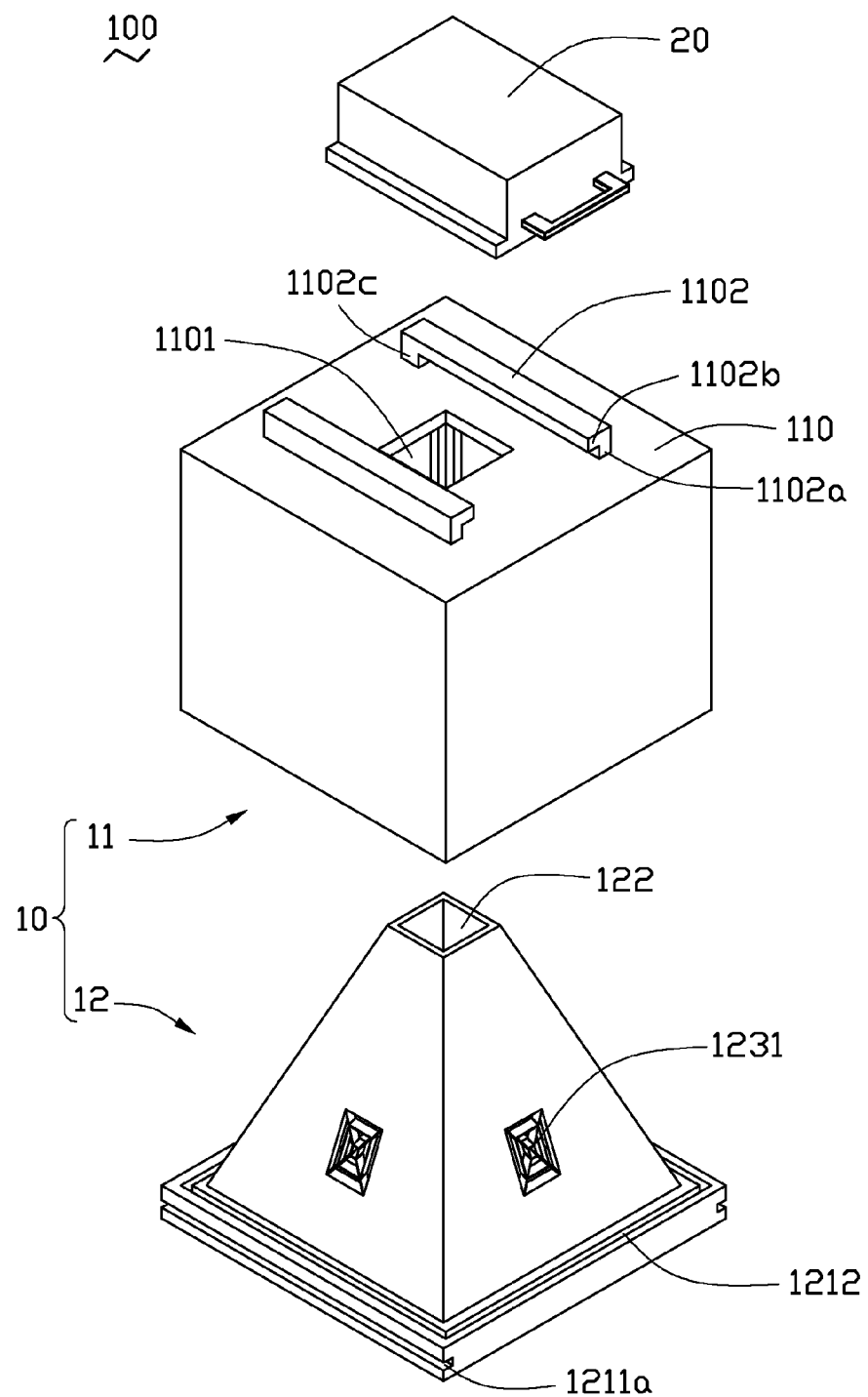
FIG. 2 is similar to FIG. 1, but showing the gathering device from another angle.

Referring to FIGS. 1-2, a gathering device 100 for gathering plastic members made by an injection molding process according to an exemplary embodiment is shown. The gathering device 100 includes a gathering portion 10 and a tray 20 connected to an end of the gathering portion 10.

The gathering portion 10 includes an outer shell 11, an inner shell 12 received in the outer shell 11, and a number of fans 13 positioned between the outer shell 11 and the inner shell 12.

The outer shell 11 includes a bottom plate 110 and a sidewall portion 11a connected to the bottom plate 110. The bottom plate 110 and the sidewall portion 11a cooperatively define a receiving space 115 therebetween. The bottom plate 110 defines a through hole 1101 generally at a central portion thereof. In the embodiment, the through hole 1101 is substantially rectangular. However, a shape of the through hole 1101 can be changed according to demands. The bottom plate 110 includes two connecting bars 1102 formed on an outer surface thereof. The connecting bars 1102 are substantially parallel to each other and respectively positioned at two opposite sides of the through hole 1101. Each connecting bar 1102 includes a first bar member 1102a, a second bar member 1102b and a stop portion 1102c. The first bar member 1102a is fixedly connected to the bottom plate 110, and the second bar member 1102b is connected to a side of the first bar member 1102a away from the bottom plate 110. The first bar member 1102a and the second bar member 1102b cooperatively form a substantially L-shaped structure. The second bar members 1102b of the connecting bars 1102 oppositely protrude a distance to each other. The stop portion 1102c is connected to and encloses an end of the L-shape structure. The sidewall portion 11a includes a first end 1110 and a second end 1112 opposite to the first end 1110. The first end 1110 is an open end. The sidewall portion 11a includes a protrusion 1111 upwardly protruding from the first end 1110. The second end 1112 is connected to the bottom plate 110.

In the embodiment, the bottom plate 110 and the sidewall portion 11a are substantially rectangular. In detail, the sidewall portion 11a includes a first sidewall 111, a second sidewall 112, a third sidewall 113 and a fourth sidewall 114. The first sidewall 111 and the third sidewall 113 are substantially parallel to each other, and the second sidewall 112 and the fourth sidewall 114 are substantially parallel to each other. The first sidewall 111 and the second sidewall 113 are perpendicularly connected to the second sidewall 112 and the fourth sidewall 114.

The outer shell 11 further includes a number of reinforcing plates 116. Each reinforcing plate 116 is right triangle-shaped. One right angle side of reinforcing plate 116 is fixedly connected to the bottom plate 110, and the other right angle side of the reinforcing plate 116 is fixedly connected to the sidewall portion 11a. In the embodiment, the reinforcing plates 116 are divide into four groups. Each group of the reinforcing plates 116 includes two reinforcing plates 1161 and 1162 substantially parallel to each other. Each group of the reinforcing plates 116 are connected to a corner of the sidewall portion 11a.

A shape of the inner shell 12 is substantial a hollow frustum. The inner shell 12 includes an entrance end 121, an exit end 122 opposite to the entrance end 121, and four sidewalls 123 connected with each other in sequence. An edge 1232 is formed between each two adjacent sidewalls 123. The entrance end 121 is larger than the exit end 122. A shape and size of the exit end 122 correspond to the shape and size of the through hole 1101 in the bottom plate 110, respectively. The inner shell 12 defines a number of vents 1231 allowing air to pass therethrough. The inner shell 12 further includes a frame 1211 connected to the entrance end 121. The frame 1211 defines a groove portion 1212 in a bottom surface and two slots 1211a on two opposite side surfaces. The groove portion 1212 faces toward the exit end 122.

The fans 13 are ion fans for eliminating static charges on the plastic members and/or the inner shell 12. The fans 113 are positioned on an inner surface of the bottom plate 110. The fans 113 blow ions from the second end 1112 to the first end 1110 of the sidewall portion 11a.

The tray 20 is substantially rectangular for containing the plastic members. The tray 20 includes two connecting blocks 21 protruding from two opposite outer surfaces of the tray 20 respectively. Each connecting block 21 is corresponding to a connecting bar 1102 of the gathering portion 10. The tray 20 further includes a handle portion 22 formed on an outer side surface thereof.

Figure 3:
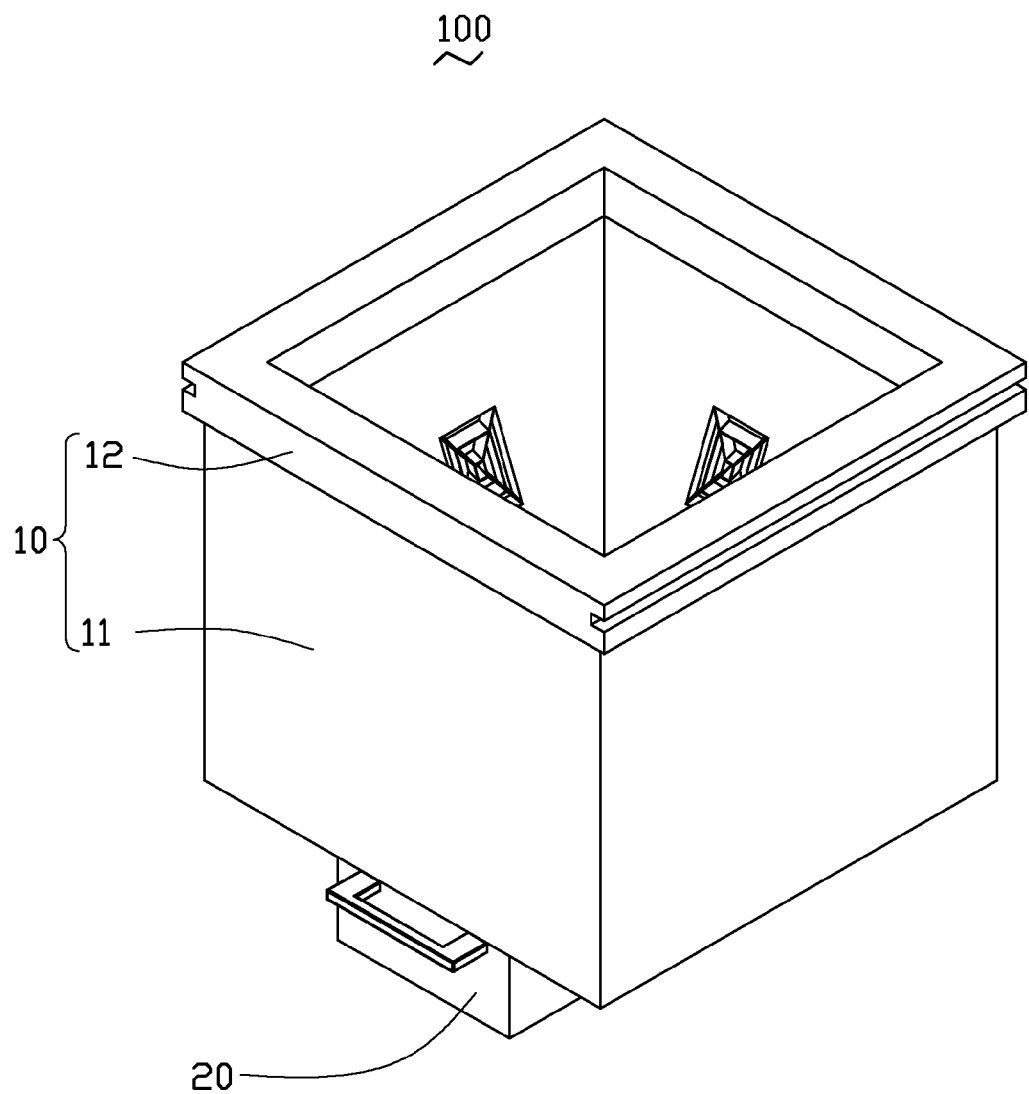
FIG. 3 is an isometric schematic view of the gathering device of FIG. 1.
Figure 4:
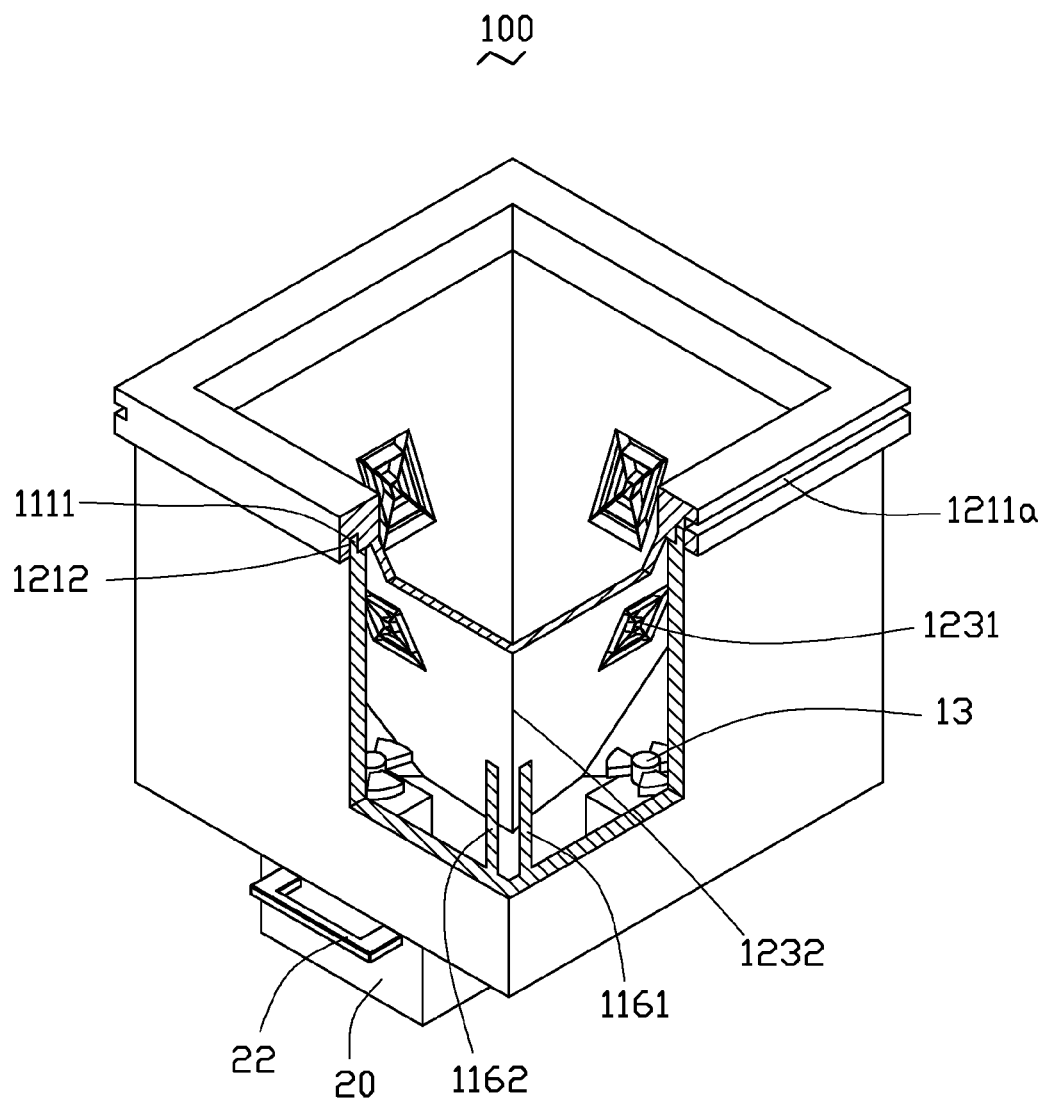
FIG. 4 is a cut-away view of the gathering device of FIG. 3.

Referring to FIGS. 3-4, in assembly, the inner shell 12 is received in the receiving space 115 of the outer shell 11. The protrusion 1111 of the outer shell 11 is engaged into the groove portion 1212, a side surface of the inner shell 12 is supported on the reinforcing plates 116, and the exit end 122 of the inner shell 12 is aligned with the through hole 1101. The tray 20 is detachably connected to the bottom plate 110 of the outer shell 11. In detail, the connecting blocks 21 are slidably supported on the second bars member 1102b. When the tray 21 is slid to a suitable position along the connecting bars 1102, the stop portions 1102c stop the tray 21. The slots 1211a of the inner shell 12 can be engaged with an injection molding device (not shown).

In use, plastic members enter into the gathering device 100 from the entrance end 121 of the inner shell 12. The fans 13 a blow ions into the inner shell 12 through the vents 1231. Static charges on the plastic members and/or the inner shell 12 can be eliminated by the ions from the fans 13. Therefore, the effect of electrostatic attraction during the gathering of the plastic members is prevented, and the plastic members can be easily gathered by the gathering device 100. The plastic members exit from the gathering portion 10 and enter into the tray 20 through the exit end 122 of the inner shell 12.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A gathering device for gathering plastic members, comprising:
    a gathering portion, comprising:
        an outer shell;
        an hollow inner shell received in the outer shell, the inner shell comprising a plurality of vents; and
        a plurality of fans positioned between the outer shell and the inner shell for blowing ions into the inner shell through the vents; and
    a tray detachably connected to the gathering portion for containing the plastic members passing through the gathering portion.

2. The gathering device of claim 1, wherein the outer shell comprises a bottom plate and a sidewall portion connected to the bottom plate, the bottom plate and the sidewall portion cooperatively define a receiving space therebetween, the inner shell is received in the receiving space, and the fans are positioned on an inner surface of the bottom plate.

3. The gathering device of claim 2, wherein the bottom plate comprises two connecting bars on an outer surface thereof, the tray comprises two connecting blocks protruding from two opposite outer surfaces of the tray respectively, each connecting block is slidably connected to a corresponding connecting bar.

4. The gathering device of claim 3, wherein each connecting bar comprises a first bar member and a second bar member, the first bar member is fixedly connected to the bottom plate, the second bar member is connected to a side of the first bar member away from the bottom plate, the first bar member and the second bar member cooperatively form a substantially L-shaped structure, the corresponding connecting block is slidably supported on the second bar member.

5. The gathering device of claim 4, wherein each connecting bar comprises a stop portion connected to and enclosing an end of the L-shape structure of the connecting bar.

6. The gathering device of claim 2, wherein the sidewall portion comprises a first end and a second end opposite to the first end, the first end is an open end, the bottom plate is connected to the second end of the sidewall portion.

7. The gathering device of claim 6, wherein the sidewall portion comprises a protrusion upwardly protruding from the first end, the inner shell defines a groove portion corresponding to the protrusion, the protrusion is engaged into the groove portion.

8. The gathering device of claim 7, wherein the inner shell comprises a frame positioned at one end thereof, and the groove portion is defined in a bottom surface of the frame.

9. The gathering device of claim 2, wherein the outer shell comprises a number of reinforcing plates connected to inner surfaces of the bottom plate and the sidewall portion, and the inner shell is supported on the reinforcing plate.

10. The gathering device of claim 9, wherein each reinforcing plate is right triangular shaped, one right angle side of reinforcing plate is fixedly connected to the bottom plate, and the other right angle side of the reinforcing plate is fixedly connected to the sidewall portion.

11. The gathering device of claim 10, wherein the sidewall portion comprises a first sidewall, a second sidewall, a third sidewall and a fourth sidewall, the first side wall and the third sidewall are substantially parallel to each other, the second sidewall and the fourth sidewall are substantially parallel to each other, and the first sidewall and the second sidewall are perpendicularly connected to the second sidewall and the fourth sidewall.

12. The gathering device of claim 11, wherein the reinforcing plates are divided into four groups, each group of reinforcing plates comprises two reinforcing plates substantially parallel to each other, and each group of reinforcing plates are connected to a corner of the sidewall portion.

13. The gathering device of claim 2, wherein the inner shell is substantial in a hollow frustum shape, the inner shell comprises an entrance end and an exit end opposite to the entrance end, and the entrance end is larger than the exit end, the bottom plate defines a through hole in a central portion thereof, and the exit end of the inner shell is aligned with the through hole.

* * * * *